(12) United States Patent
Barrett et al.

(10) Patent No.: US 6,490,858 B2
(45) Date of Patent: Dec. 10, 2002

(54) CATALYTIC CONVERTER THERMAL AGING METHOD AND APPARATUS

(76) Inventors: Ashley J. Barrett, 1065 Moore Rd., Milford, MI (US) 48381; Bruce H. Woodrow, 623 River Oaks Dr., Milford, MI (US) 48381

( * ) Notice: Subject to any disclaimer, the term of this patent is extended or adjusted under 35 U.S.C. 154(b) by 34 days.

(21) Appl. No.: 09/785,742

(22) Filed: Feb. 16, 2001

(65) Prior Publication Data

US 2002/0112468 A1 Aug. 22, 2002

(51) Int. Cl.[7] ............................................... F01N 5/04
(52) U.S. Cl. ........................... 60/280; 60/299; 60/605.2
(58) Field of Search ........................ 60/280, 299, 605.2; 73/23.31, 23.32

(56) References Cited

U.S. PATENT DOCUMENTS

| | | | | | |
|---|---|---|---|---|---|
| 3,096,615 A | * | 7/1963 | Zuhn | .............................. | 60/317 |
| 3,163,984 A | * | 1/1965 | Dumont | ........................ | 60/290 |
| 3,775,971 A | * | 12/1973 | Gadefelt | ...................... | 60/278 |
| 4,449,370 A | * | 5/1984 | Ream | ........................... | 60/303 |
| 4,529,356 A | * | 7/1985 | Ciccarone | .................... | 415/207 |
| 4,685,287 A | * | 8/1987 | Takuma | ........................ | 60/785 |
| 5,381,659 A | * | 1/1995 | Loving et al. | ................. | 60/280 |
| 6,397,588 B1 | * | 6/2002 | Bruck et al. | ................. | 422/177 |

* cited by examiner

*Primary Examiner*—Thomas Denion
*Assistant Examiner*—Diem Tran
(74) *Attorney, Agent, or Firm*—Fildes & Outland, P.C.

(57) ABSTRACT

A method and apparatus for the thermal aging of catalytic converters uses a gas dynamic exhaust gas generator for generating heated exhaust gas for the thermal aging process. The gas generator includes a gas dynamic air compressor, an exhaust gas turbine driving the compressor and a combustor or burner receiving compressed air from the compressor, for burning fuel to form heated combustion products, delivered as heated compressed exhaust gas to the turbine for driving the compressor. In a preferred embodiment, the cost of the converter aging apparatus is reduced by using a commercially available engine exhaust turbocharger to provide the compressor and turbine. A combustor is connected between the compressor and turbine and the desired fuel and air connections, controls and an exhaust conduit are provided to complete the apparatus. The turbocharger may be sized for aging one or a plurality of catalytic converters at the same time.

8 Claims, 2 Drawing Sheets

CATALYTIC CONVERTER THERMAL AGING METHOD AND APPARATUS

TECHNICAL FIELD

This invention relates to thermal aging of catalytic converters for engine emission control qualification testing and, more particularly, to methods and apparatus for carrying out thermal aging processes.

BACKGROUND OF THE INVENTION

The qualification of exhaust emission equipment for use with automotive vehicle engines requires testing of its operation under prescribed conditions when new and at various subsequent intervals of normal use in order to meet various federal and international emission control regulations. Thus, exhaust gas catalytic converters intended for automotive engine exhaust emission control are tested with their intended or comparable engines at various actual or simulated mileage intervals to their required maximum life.

To provide the catalytic converters needed for testing at the various vehicle mileage conditions, catalytic converters are thermally aged by operation of one or more converter units connected to the exhaust system of an engine under operating conditions of air/fuel ratio, temperature and mass flow representing the thermal degradation/ deterioration of the catalyst over a prescribed corresponding vehicle operating mileage. This is done in an aging facility using a large number of engines, each connected with one or several catalytic converters. In view of the number of engines required and their cost, a more cost effective and efficient apparatus for aging catalytic converters is desired.

SUMMARY OF THE INVENTION

The present invention provides methods and apparatus for the thermal aging of catalytic converters which uses a relatively simple gas dynamic exhaust gas generator in place of a complex piston engine for generating the heated exhaust gas needed for the thermal aging of catalytic converters. The gas generator includes a gas dynamic air compressor, an exhaust gas turbine connected for driving the compressor and a combustor or burner connected to receive compressed air from the compressor, to burn fuel in the compressed air to form heated combustion products, and to deliver the combustion products as heated compressed exhaust gas to the turbine for driving the compressor.

A control is provided to control the ratio of air and fuel in the combustor and an exhaust conduit from the turbine provides for connection with one or more catalytic converters to be aged. Supplemental air and fuel delivery apparatus may also be connected with the exhaust conduit for supplying added air and fuel to control the operating cycle conditions as desired in the catalytic converter or converters. A manifold may be connected with the exhaust conduit for distributing the exhaust gas to several catalytic converters for aging a plurality of converters with one exhaust gas generator.

In a preferred embodiment, the cost of the converter aging apparatus is reduced by using a commercially available engine exhaust turbocharger to provide the needed compressor and turbine. A suitable combustor is connected between the compressor and turbine and the desired fuel and air connections and controls and an exhaust conduit are provided to complete the apparatus. The turbocharger may be sized and controlled to provide the exhaust gas conditions needed for aging of one or a plurality of catalytic converters at the same time.

These and other features and advantages of the invention will be more fully understood from the following detailed description of the invention taken together with the accompanying drawings.

DETAILED DESCRIPTION OF THE INVENTION

Figure 1:
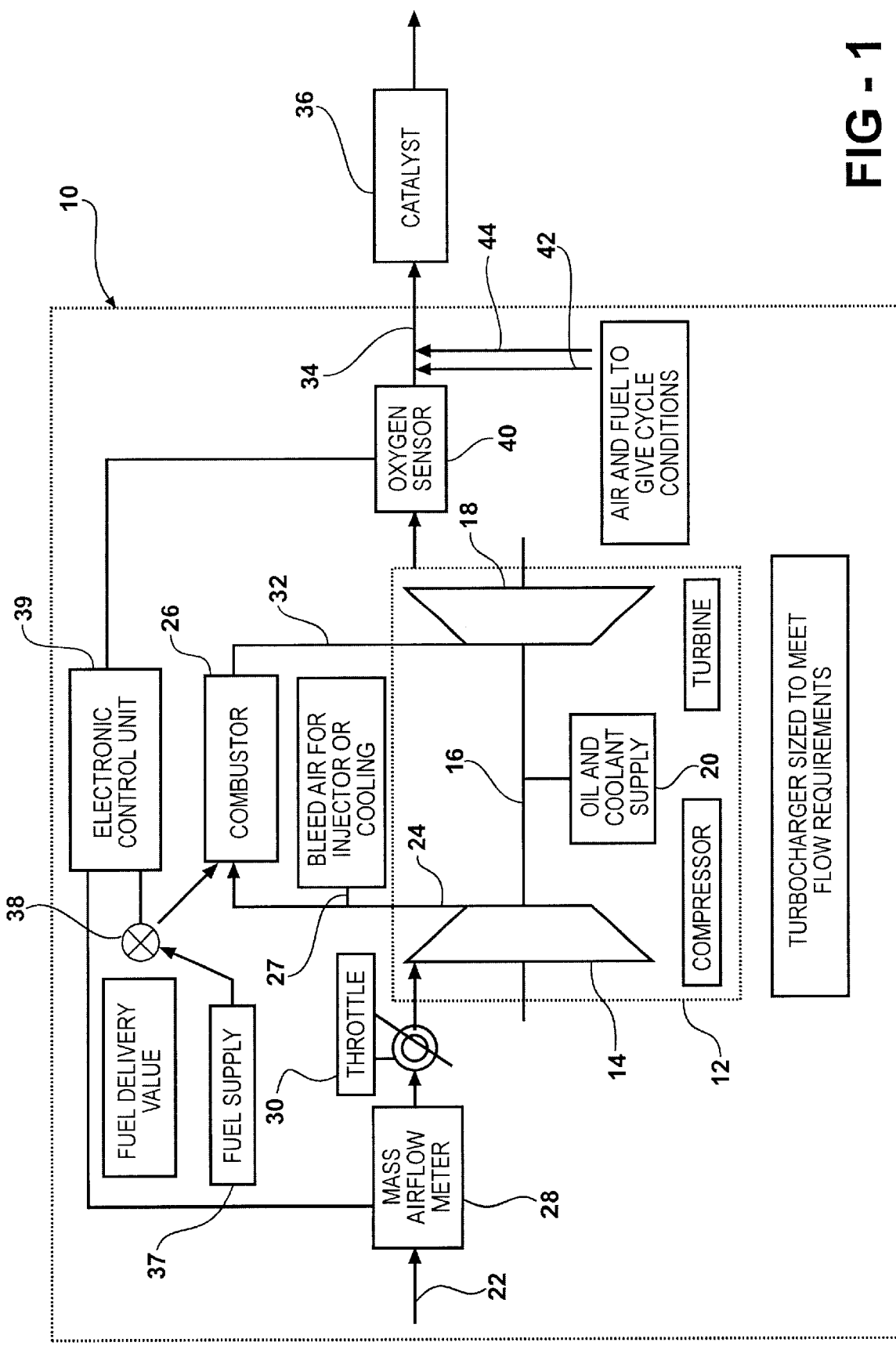
FIG. 1 is a diagram of an exemplary embodiment of thermal aging apparatus connected with a single catalytic converter according to the invention.

Referring first to FIG. 1 of the drawings in detail, numeral 10 generally indicates in diagrammatic form an exemplary embodiment of catalytic converter thermal aging apparatus according to the invention. Apparatus 10 includes a gas dynamic exhaust gas generator formed in part by a turbocharger 12 including a gas dynamic air compressor 14 directly connected by a shaft 16 to an exhaust gas turbine 18. The shaft 16 is rotatably carried on bearings, not shown, lubricated by oil and cooled by cooling fluid from an external supply 20.

Compressor 14 includes an inlet duct 22 through which ambient air is drawn in and an outlet duct 24 through which compressed air is exhausted from the compressor. The outlet duct 24 connects with a burner or combustor 26, which receives the compressed air from the compressor 14. A bleed air line 27 may also be connected with the duct 24 for supplying pressurized air for injection or cooling. A mass air flow meter (MAF) 28 is connected in the inlet duct 22 for sensing the mass air flow delivered to the compressor 14. The air flow is controlled by a throttle valve 30 which may be manually adjusted to obtain a desired air flow.

The combustor 26 connects with a turbine inlet duct 32, which carries combustion products in the form of pressurized exhaust gas to the turbine 18. The exhaust gas pressure rotatably drives the turbine which in turn drives the compressor 14 through the shaft 16. The spent exhaust gas is discharged through a turbine exhaust conduit 34 which is made to be connected to a catalytic converter 36 installed to be thermally aged by the apparatus 10.

The combustor 26 is supplied with fuel from a fuel supply 37 through a fuel delivery valve 38 controlled by an electronic control unit (ECU) 39. The ECU processes air flow signals from the MAF and closed loop feedback from an oxygen sensor 40 in the turbine exhaust conduit 34 to control the level of fuel flow to maintain a desired air/fuel ratio in the combustor 26.

Supplemental air and fuel delivery tubes or injectors 42, 44 may be connected with the turbine exhaust conduit 34 to provide additional air and fuel to the exhaust gas for delivery to the catalytic converter 36 to provide or maintain the desired operating conditions for the catalyst aging process of the particular converter being processed.

In operation, a catalytic converter 36 to be aged is connected to the turbine exhaust conduit 34 of the catalytic converter thermal aging apparatus 10. The turbocharger 12 is started by external means and fuel is supplied to the combustor 26 to burn air delivered to the combustor. Pressurized hot exhaust gas from the combustor 26 is fed to the turbine 18 to maintain rotation of the turbocharger 12. The hot exhaust gas is discharged from the turbine 18 at low pressure and heats the converter 36 to the required temperature. The ECY 39 responds to signals from the MAF 28 and oxygen sensor 40 to control flow through the fuel delivery valve 38 to maintain a desired air/fuel ratio and temperature in the combustor 26.

The apparatus is operated continuously under selected conditions so that the converter 36 is thermally aged by operation of the catalyst for a period equivalent to a corresponding mileage of vehicle operation. The converter 36 is then removed and delivered to a vehicle or engine test location for testing the operation of the converter with an engine to determine its operation at the equivalent test mileage.

Figure 2:
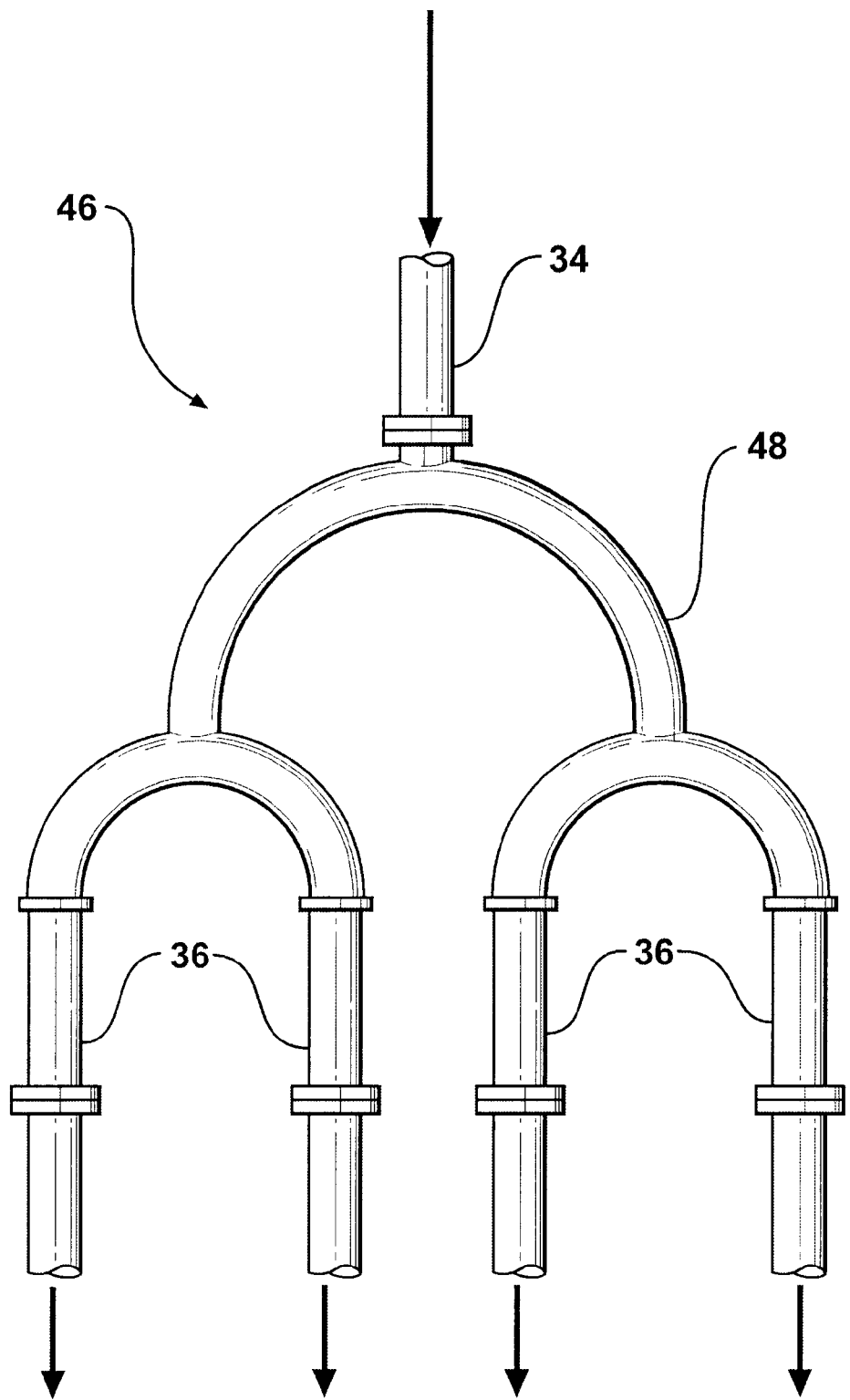
FIG. 2 is a diagram of the manifold connection of a modified embodiment of apparatus connected with a plurality of catalytic converters.

Referring to FIG. 2, an alternative embodiment of apparatus 46 is shown wherein the turbine exhaust conduit 34 of the apparatus 10 of FIG. 1 is connected to a manifold 48. This allows connection of multiple catalytic converters 36 to the apparatus 46 for concurrent aging of a plurality of converters with the catalytic converter thermal aging apparatus 46.

Although the invention has been described by reference to certain specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A method for thermal aging of catalytic converters by simulating operation with an engine for a prescribed period for subsequent use in vehicle/engine testing of the emission controlling action of the aged converters, the method comprising:

providing a gas dynamic exhaust gas generator including a gas dynamic air compressor, an exhaust gas turbine connected for driving the compressor and a combustor connected to receive compressed air from the compressor;

rotating the compressor to send compressed air to the combustor;

burning fuel in the combustor to heat the air charge and to deliver heated compressed exhaust gas to the turbine for driving the compressor;

conducting the spent hot exhaust gas through a turbine exhaust to a connected catalytic converter being thermally aged; and controlling the fuel and air flow to the combustor to provide a desired air/fuel ratio in the combustor.

2. A method as in claim 1 including adding at least one of supplemental air and fuel to the heated exhaust gas in amounts to provide desired operating cycle conditions in the catalytic converter being thermally aged.

3. A method as in claim 1 wherein the compressor and the turbine are in an engine turbocharger sized to provide desired exhaust gas flow for the catalytic converter.

4. A method as in claim 1 including delivering the heated exhaust gas from the turbine through a manifold to a plurality of catalytic converters being thermally aged.

5. Apparatus for thermal aging of catalytic converters by simulating operation with an engine for a prescribed period for subsequent use in vehicle/engine testing of the emission controlling action of the aged converters, the apparatus comprising:

a gas dynamic exhaust gas generator including a gas dynamic air compressor, an exhaust gas turbine connected for driving the compressor and a combustor connected to receive compressed air from the compressor, to burn fuel in the compressed air and to deliver heated compressed exhaust gas to the turbine for driving the compressor;

a control for controlling air/fuel ratio in the combustor; and an exhaust conduit from the turbine for connection with a catalytic converter to be thermally aged.

6. Apparatus as in claim 5 wherein the compressor and the turbine are in an engine turbocharger sized to provide desired exhaust gas flow for the catalytic converter.

7. Apparatus as in claim 5 including supplemental air and fuel delivery apparatus connected to the turbine exhaust conduit for providing desired operating cycle conditions in the catalytic converter.

8. Apparatus as in claim 5 including a manifold connected with the exhaust conduit for connecting a plurality of catalytic converters to the converter aging apparatus.

* * * * *